(12) United States Patent
    Yaffe (10) Patent No.: US 10,730,587 B2
(45) Date of Patent: Aug. 4, 2020

(54) GEARSHIFTER ASSEMBLIES FOR MOTORCYCLES

(71) Applicant: Paul Yaffe, Phoenix, AZ (US)

(72) Inventor: Paul Yaffe, Phoenix, AZ (US)

( * ) Notice: Subject to any disclaimer, the term of this patent is extended or adjusted under 35 U.S.C. 154(b) by 133 days.

(21) Appl. No.: 15/996,138

(22) Filed: Jun. 1, 2018

(65) Prior Publication Data

US 2019/0367130 A1    Dec. 5, 2019

(51) Int. Cl.
    *B62M 25/06*    (2006.01)
    *B62K 23/08*    (2006.01)

(52) U.S. Cl.
    CPC ............. *B62M 25/06* (2013.01); *B62K 23/08* (2013.01)

(58) Field of Classification Search
    CPC ................................ B62M 25/06; B62K 23/08
    See application file for complete search history.

(56) References Cited

U.S. PATENT DOCUMENTS

2009/0255360 A1* 10/2009 Witteveen ............. B62K 23/08
                                                                74/473.16

FOREIGN PATENT DOCUMENTS

EP            2020372 A2 *  2/2009  ............. B62J 25/00
WO    WO-2013002764 A1 *  1/2013  ............. B62J 25/00

* cited by examiner

*Primary Examiner* — Vicky A Johnson
(74) *Attorney, Agent, or Firm* — Ice Miller LLP (57) ABSTRACT

An apparatus disclosed herein includes a heel-shift lever. When the heel-shift lever is coupled to a motor vehicle, a first portion of the heel-shift lever is disposed higher than a first area of a floor of a floorboard of the motor vehicle, a second portion of the heel-shift lever is disposed lower than the first area of the floor of the floorboard, and a third portion of the heel-shift lever is disposed higher than a second area of the floor of the floorboard. The second portion is disposed between the first portion and the third portion.

8 Claims, 12 Drawing Sheets

GEARSHIFTER ASSEMBLIES FOR MOTORCYCLES

FIELD

This disclosure relates generally to motor vehicles and, more particularly, to gearshifter assemblies for motor vehicles and motorcycles.

BACKGROUND

Typical motorcycles and other vehicles often include floorboards to enable a rider to rest his or her feet in a variety of positions. A heel-toe gearshifter assembly may be disposed above a floorboard on a left side of the motor vehicle. The heel-toe shifter assembly often includes two levers: a toe-shift lever extending forward from a fulcrum and a heel-shift lever extending rearward from the fulcrum. In such applications, to shift the motor vehicle into a lower gear, the rider may press down on a distal end of the toe-shift lever. To shift the motor vehicle into a higher gear, the rider may press down on a distal end of the heel-shift lever. In some configurations, the toe-shift lever and the heel-shift lever are integrated into a single piece that pivots up and down around a fulcrum located at a central portion of the unitary piece.

DETAILED DESCRIPTION

Example gearshifter assemblies in accordance with the teachings of this disclosure may be sleek and compact, and further enable a motor vehicle rider to utilize most or all available surface area of the shifter-side floorboard of the motor vehicle while allowing fast and accurate upshifts and downshifts. For example, an example heel-toe shifter assembly disclosed herein includes a heel-shift lever that snakes from above and/or higher than the floorboard to beneath and/or lower than the floorboard, then up through a gap between the floorboard and an engine or outer primary cover of the motor vehicle. As a result, portions of the example heel-shift lever are disposed below and/or lower than the floorboard and out of the way of the rider, enabling the rider to utilize most or all of the surface area of the floorboard and then, when desired, perform fast, accurate upshifts.

Figure 1:
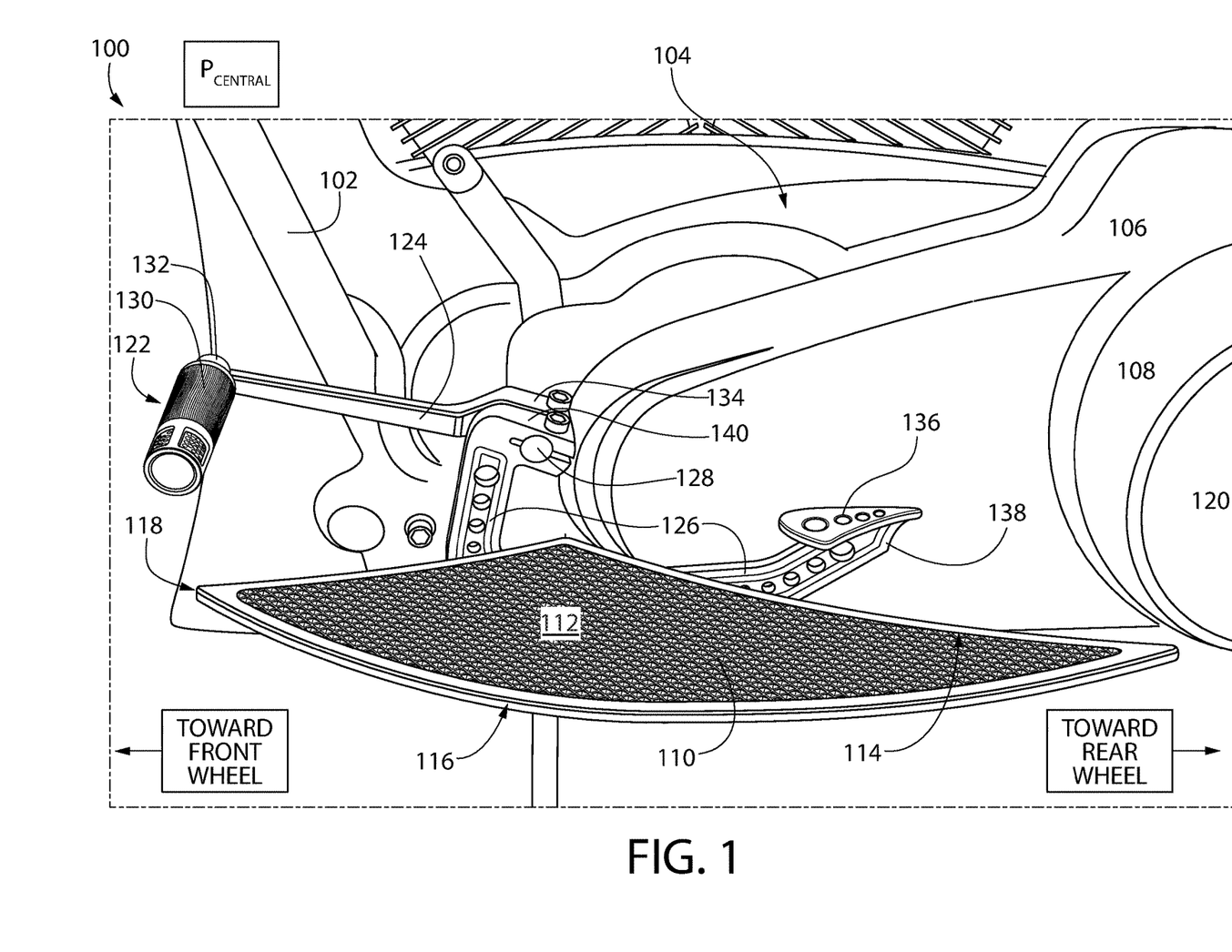
FIG. 1 illustrates an example motor vehicle employing an example heel-toe shifter assembly disclosed herein.

FIG. 1 illustrates an example motor vehicle 100 disclosed herein. In the illustrated example, the motor vehicle 100 includes a frame 102 supporting an engine 104 and a transmission (not shown). The engine 104 includes an engine cover 106 (e.g., an outer primary cover) covering, for example, one or more portions of the engine 104, primary drive, and/or the transmission such as one or more belts, chains, gears, and/or additional and/or alternative components. In the illustrated example, the engine cover 106 is disposed on a left side 108 of the engine 104. The terms "left," and "right" are used in this disclosure from the perspective of a rider of the motor vehicle 100 and relative to a central plane $P_{CENTRAL}$ extending through a center of the motor vehicle 100, a front wheel (not shown) of the motor vehicle 100, and a rear wheel (not shown) of the motor vehicle 100.

In the illustrated example, the motor vehicle 100 includes a floorboard 110 coupled to the frame 102 and/or the engine 104. The floorboard 110 of FIG. 1 is spaced apart from and runs alongside the left side 108 of the engine 104. In the illustrated example, the floorboard includes a floor or upper surface 112 to receive a foot of the rider of the motor vehicle 100. The upper surface 112 faces away from Earth when the motor vehicle 100 is upright. Thus, the upper surface 112 generally faces toward a seat and/or gas tank of the motor vehicle. The floorboard 110 includes an inner side 114, an outer side 116 opposite the inner side 114, a forward or front side 118, and a back or rearward side 120 opposite the front side 118. In the illustrated example, the inner side 114 faces the engine 104 and is closer to the engine 104 than the outer side 116. The front side 118 is disposed fore of the back side 120.

The motor vehicle 100 of FIG. 1 includes an example heel-toe shifter assembly 122. The heel-toe shifter assembly 122 includes a toe-shift lever 124 and a heel-shift lever 126 coupled to a shaft 128. In the illustrated example, a peg 130 is coupled to a distal end portion 132 of the toe-shift lever 124. The example peg 130 of FIG. 1 is cylindrical. In other examples, the peg 130 is other shapes and/or configurations. The distal end portion 132 of the toe-shift lever 124 and the peg 130 are disposed fore of the shaft 128. A proximal end portion 134 of the toe-shift lever 124 is coupled to the shaft 128 to enable the toe-shift lever 124 to rotate with the shaft 128.

A platform 136 is disposed on a distal end portion 138 of the heel-shift lever 126. In some examples, the platform 136 is coupled to the distal end portion 138 via a weld, one or more fasteners, and/or one or more additional and/or alternative fasteners. In some examples, the platform 136 is removably or releasably coupled to the heel-shift lever 126. In some examples, the platform 136 is non-removably or permanently coupled to the heel-shift lever 126. In some examples, the platform 136 is integral with the heel-shift lever 126. The distal end portion 138 and the platform 136 of the heel-shift lever 126 are disposed aft of the shaft 128. A proximal end portion 140 of the heel-shift lever 126 is coupled to the shaft 128 to enable the heel-shift lever 126 to rotate with the shaft 128.

In the illustrated example, the toe-shift lever 124 and the heel-shift lever 126 are separate parts or components coupled to different portions of the shaft 128. Thus, the example heel-shift lever 126 may be decoupled from the shaft 128 without decoupling the example toe-shift lever 124 from the shaft. In other examples, the toe-shift lever 124 and/or the heel-shift lever 126 are configured in one or more additional and/or alternative ways. For example, the toe-shift lever 124 may be integral with the heel-shift lever 126 (e.g., composed of a single piece of metal), the toe-shift lever 124 may be supported by the heel-shift lever 126 (e.g., the proximal end portion 134 of the toe-shift lever 124 may be coupled directly to the proximal end portion 140 of the heel-shift lever 126), the heel-shift lever 126 may be supported by the toe-shift lever 124 (e.g., the proximal end portion 140 of the heel-shift lever 126 may be coupled directly to the proximal end portion 134 of the toe-shift lever), and/or the toe-shift lever 124 and/or the heel-shift lever 126 may be configured in one or more additional and/or alternative ways.

The example shaft 128 of FIG. 1 is a fulcrum about which the toe-shift lever 124 and the heel-shift lever 126 rotate to shift gears during operation of the motor vehicle 100. In the illustrated example, the shaft 128 is operatively coupled to the transmission of the motor vehicle 100 to enable rotation of the shaft 128 to shift gears of the motor vehicle 100. When the distal end portion 132 of the toe-shift lever 124 rotates downward or toward the floorboard 110 (e.g., counterclockwise in the perspective of FIG. 1), the shaft 128 rotates with the toe-shift lever 124 to shift the motor vehicle 100 into a lower gear. When the distal end portion 138 of the heel-shift lever 126 rotates downward or toward the floorboard (e.g., clockwise in the perspective of FIG. 1), the shaft 128 rotates with the heel-shift lever 126 to shift the motor vehicle 100 into a higher gear. The toe-shift lever 124 and/or the heel-shift lever 126 may rotate to shift into and out of neutral.

Figure 2:
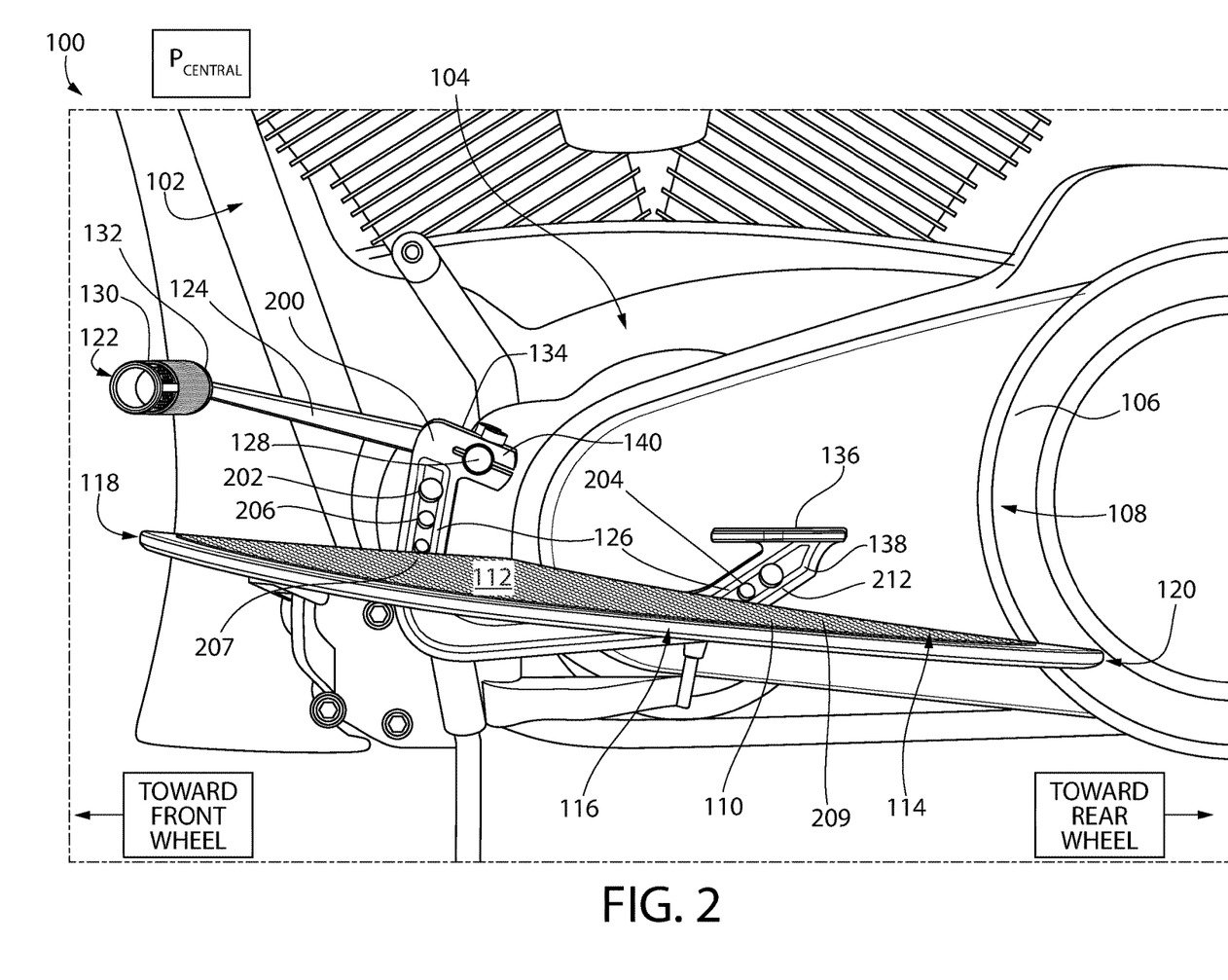
FIG. 2 is a side view of the motor vehicle and the heel-toe shifter assembly of FIG. 1.

FIG. 2 is a side-view of the example motor vehicle 100 of FIG. 1. In the illustrated example, the heel-shift lever 126 includes a head 200, a neck 202 extending from the head 200, and an arm 204 extending from the neck 202. In some examples, the head 200, the neck 202 and/or the arm 204 may be manufactured from a single piece of metal (e.g., a steel plate). In other examples, the head 200, the neck 202, and/or the arm 204 may be separate components.

In the illustrated example, the head 200 and a first portion 206 of the neck 202 are disposed above and/or higher than a first area 207 of the floor 112 of the floorboard 110 juxtaposing the neck 202. Thus, the first area 207 is disposed at a first height, and the first portion 206 of the neck 202 and the head 200 are disposed at heights higher than the first height. A second portion 208 (FIG. 3) of the neck 202 is disposed below and/or lower than the first area 207 of the floor 112 of the floorboard 110. Thus, the second portion 208 of the neck 202 is disposed at height(s) lower than the first height. In the illustrated example, the head 200 includes the proximal end portion 140 of the heel-shift lever 126. In some examples, the heel-shift lever 126 does not include the head 200 (e.g., the neck 202 may couple directly to the shaft 128).

The example arm 204 extends from below and/or lower than the first area 207 of the floor 112 of the floorboard 110 to above and/or higher than a second area 209 of the floor 112 of the floorboard 110. The second area 209 of the floor 112 is aft of the first area 207 and juxtaposes the arm 204. The second area 209 of the floor 112 is disposed at a second height. In some examples, the first height and the second height are the same. In other examples, the first height and the second height are different. In the illustrated example, the arm 204 of FIG. 2 includes a first portion 210 (FIG. 3) disposed below and/or lower than the first area 207 and the second area 209 of the floor 112 of the floorboard 110. Thus, the first portion 210 of the arm 204 may be disposed at height(s) lower than the first height and the second height. The example arm 204 also includes a second portion 212 disposed above and/or higher than the second area 209 of the floor 112 of the floorboard 110. Thus, the second portion 212 of the arm 204 is disposed at height(s) higher than the second height of the second area 209 of the floor 112. The second portion 212 of the arm 204 includes the distal end portion 138 of the heel-shift lever 126. Therefore, the platform 136 is disposed above and/or higher than the second area 209 of the floor 112 of the floorboard 110 and, thus, at height(s) higher than the second height. In the illustrated example, the heel-shift lever 126 is disposed aft of the front side 118 of the floorboard 110 and fore of the rear side 120 of the floorboard 110. Thus, the example platform 136 is disposed fore of the rear side 120 of the floorboard 110.

In the illustrated example, the head 200 extends upward (i.e., away from the floorboard 110) and fore from the shaft 128 to a junction 214 of the neck 202 and the head 200. Thus, in the illustrated example, the head 200 is not extending horizontally (e.g., substantially parallel to Earth). In other examples, the head 200 extends horizontally when the head 200 is coupled to the shaft 128. The neck 202 extends downward (i.e., toward the floor 112 and Earth) and fore (i.e., away from the platform 136) from the junction 214 of the head 200 and the neck 202. Thus, in the illustrated example, the neck 202 is not extending vertically (i.e., straight upward relative to Earth). In other examples, the neck 202 extends substantially vertically. The neck 202 of FIG. 2 is disposed fore of the shaft 128.

Figure 3:
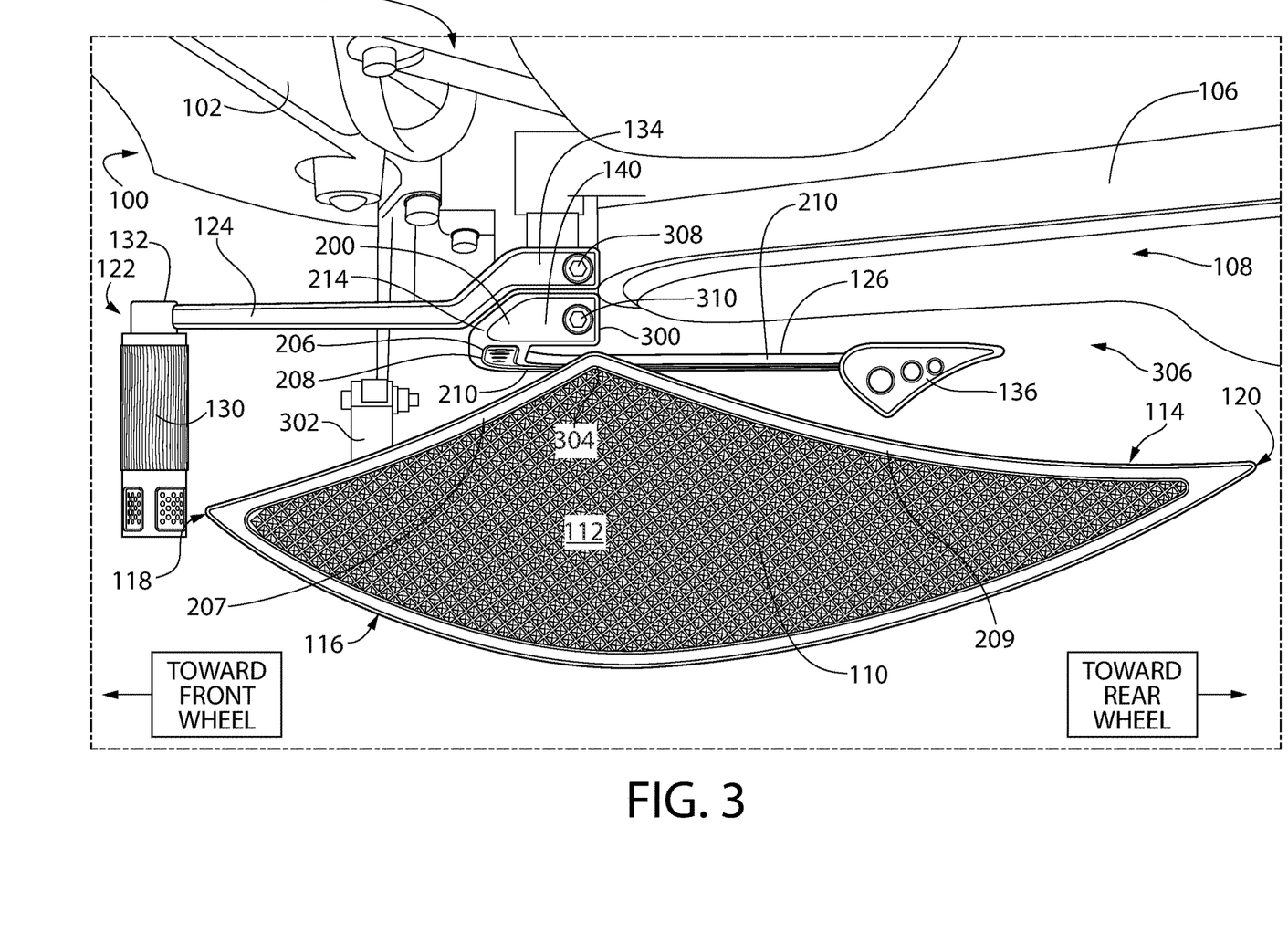
FIG. 3 is a top view of the heel-toe shifter assembly of FIGS. 1-2.

FIG. 3 is a top view of the example heel-toe shifter assembly 122 of FIGS. 1 and 2. In the illustrated example, the floorboard 110 is coupled to the frame 102 and/or the engine 104 via a first support 300 and a second support 302. In some examples, the first support 300 extends substantially perpendicular to the plane $P_{CENTRAL}$ (i.e., substantially horizontal relative to Earth). In other examples, the first support 300 is oriented in one or more additional and/or alternative ways. The first support 300 and/or the second support 302 may be one or more bars, one or more brackets, a truss, and/or one or more additional and/or alternative components that support the floorboard 110 on the motor vehicle 100 and/or couple the floorboard 110 to the frame 102 and/or the engine 104. In the illustrated example, the first support 300 is disposed fore of the engine cover 106 and aft of the shaft 128. In other examples, the first support 300 is disposed on other locations.

The first portion 210 of the arm 204 of the heel-shift lever 126 extends or snakes rearward or aft from the second portion 208 of the neck 202 to underneath the first support 300 and/or a third portion 304 of the floorboard 100 to rearward or aft of the first support 300 and/or the third portion 304 of the floorboard 110. The arm 204 then extends aft and upward (i.e., away from Earth) through a space or gap 306 between the inner side 114 of the floorboard 110 and the left side 108 and/or engine cover 106 to enable the second portion 212 of the arm 204 and the platform 136 to be disposed above and/or higher than the floor 112 of the floorboard 110. As described in greater detail below in conjunction with FIG. 5, the arm 204 includes a second elbow 502 (FIG. 5) between the first portion 210 and the second portion 212. In the illustrated example, the second elbow 502 of the arm 204 interposes the inner side 114 of the floorboard 110 and the left side 108 of the engine 104. In other examples, the floorboard 110 includes a slot or aperture, and the arm 204 extends through the slot or aperture to enable the platform 136 to be disposed above and/or higher than the floor 112 of the floorboard 110.

In the illustrated example (FIG. 3), a first fastener 308 is received in the proximal end portion 134 of the toe-shift lever 124. A second fastener 310 is received in the head 200 of the heel-shift lever 126. In the illustrated example, the first fastener 308 is a bolt, and the second fastener 310 is a bolt. The first fastener 308 couples the toe-shift lever 124 to the shaft 128, and as described in greater detail below in conjunction with FIG. 4, the second fastener 310 couples the heel-shift lever 126 to the shaft 128. In other examples, the toe-shift lever 124 and/or the heel-shift lever 126 employ one or more additional and/or alternative types of fasteners and/or couplings to couple the toe-shift lever 124 and/or the heel-shift lever 126 to the shaft 128.

Figure 4:
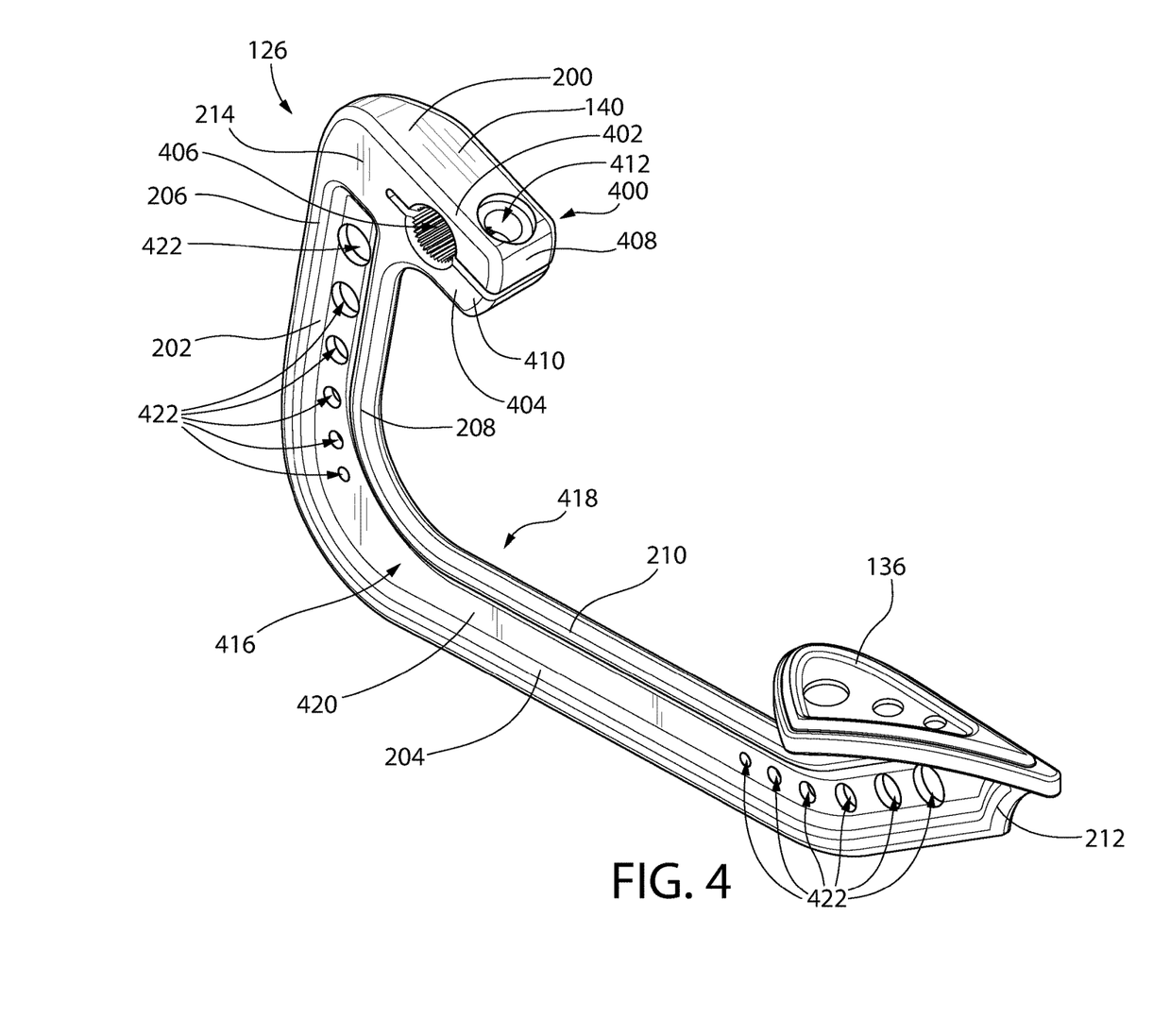
FIG. 4 is a perspective view of an example heel-shift lever of the heel-toe shifter assembly of FIGS. 1-3.

FIG. 4 is a perspective view of the example heel-shift lever 126 and the platform 136 of FIGS. 1-3. In the illustrated example, the head 200 includes a vise 400 including a first jaw 402 and a second jaw 404 opposite the first jaw 402. The first jaw 402 and the second jaw 404 define a first aperture 406 to receive the shaft 128 between the first jaw 402 and the second jaw 404. The first jaw 402 includes a first tooth 408 distal of the first aperture 406, and the second jaw 404 includes a second tooth 410 opposite the first tooth 408 and distal of the first aperture 406. The first jaw 402 includes a second aperture 412 oriented substantially perpendicular to the first aperture 406 and extending through the first tooth 408. The second tooth 410 includes a socket or third aperture 414 (FIG. 7) substantially coaxial with the second aperture 412. The second aperture 412 and the third aperture 414 receive the second fastener 310 (FIG. 3). When the second fastener 310 is received in the second aperture 412 and is received in and threaded into the third aperture 414, the first jaw 402 moves toward the second jaw 404 and/or the second jaw 404 moves toward the first jaw 402 to clamp the first jaw 402 and the second jaw 404 to the shaft 128 to secure the heel-shift lever 126 to the shaft 128.

In the illustrated example, the heel-shift lever 126 includes a first side 416 and a second side 418 opposite the first side 416. When the heel-shift lever 126 is coupled to the shaft 128, the second side 418 faces the engine 104 and/or the engine cover 106, and the first side 416 of the heel-shift lever 126 faces the floorboard 110. The first side 416 includes a channel or groove 420 extending from the first portion 206 of the neck 202 to the second portion 212 of the arm 204. The example heel-shift lever 126 includes a plurality of apertures 422 disposed within a boundary of the channel 420. The channel 420 and/or the apertures 422 reduce a weight of the heel-shift lever 126 relative to the heel-shift lever 126 without the channel 420 and/or the apertures 422.

Figure 5:
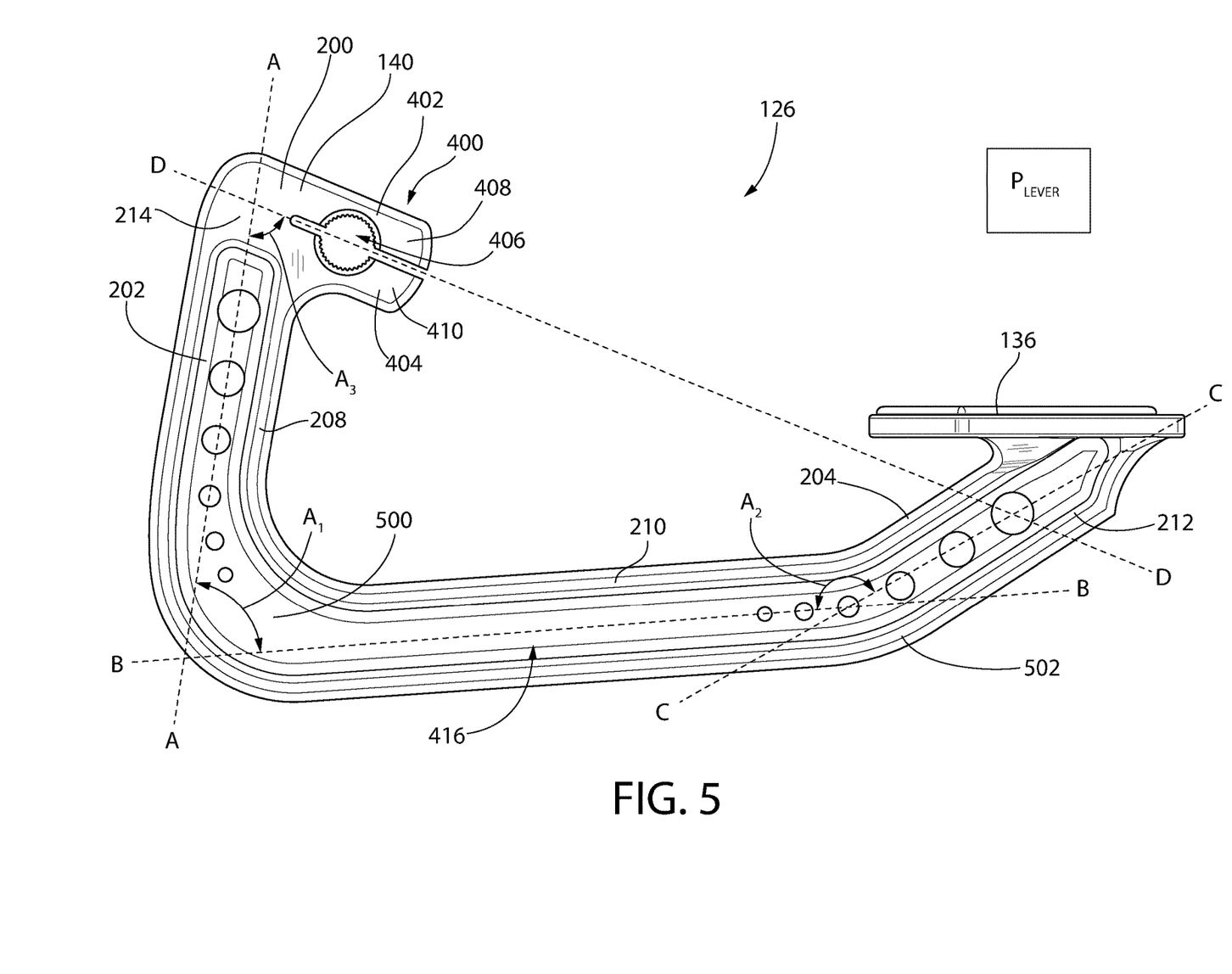
FIG. 5 is a first side view of the heel-shift lever of FIG. 4.

FIG. 5 is a first side view of the example heel-shift lever 126 of FIGS. 1-4. In the illustrated example, the neck 202 and the first portion 210 of the arm 204 are substantially straight. The arm 204 includes a first elbow 500 disposed between the neck 202 and the first portion 210 of the arm 204. The example first elbow 500 of FIG. 5 is a curved portion of the arm 204. In other examples, the first elbow 500 is other shapes and/or configurations, such as an angled (e.g., V-shaped) portion of the arm 204. The example arm 204 of FIG. 5 includes a second elbow 502 disposed between the first portion 210 and the second portion 212 of the arm to enable the second portion 212 of the arm 204 to extend upward and aft when the heel-shift lever 126 is coupled to the shaft 128. In the illustrated example, the second elbow 502 is a curved portion of the arm 204. In other examples, the second elbow 502 is an angled portion of the arm 204. In the illustrated example, the first portion 210 of the arm 204 and the second portion 212 of the arm 204 are substantially straight. In other examples, the first portion 210 and/or the second portion 212 of the arm 204 are curved. In some examples, the arm 204 does not include the second elbow 502. In other examples, the heel-shift lever 126 is other shapes. For example, the heel-shift lever 126 may be U-shaped, C-shaped, V-shaped, include more or fewer than two elbows, have different numbers of straight and/or curved portions, etc. Some examples of the heel-shift lever 126 having other shapes are described below in FIGS. 10-12.

In the illustrated example, the neck 202 includes a first central, longitudinal axis A-A. The first portion 210 of the arm 204 includes a second central, longitudinal axis B-B. The second portion 212 of the arm 204 includes a third central, longitudinal axis C-C. In the illustrated example, the first central, longitudinal axis A-A, the second central, longitudinal axis B-B, and the third central, longitudinal axis C-C are substantially coplanar with a plane $P_{LEVER}$. The plane $P_{LEVER}$ longitudinally bisects the heel-shift lever 126. In other examples, the first central, longitudinal axis A-A, the second central, longitudinal axis B-B, and/or the third central, longitudinal axis C-C are not coplanar (e.g., offset and substantially parallel, offset and not substantially parallel, and/or orientated and/or configured in other ways). An example of the heel-shift lever 126 where the neck 202, arm 204, and/or portions of the arm 204 are not coplanar is described below in FIG. 13.

In the illustrated example, the first central, longitudinal axis A-A and the second central, longitudinal axis B-B intersect to form an acute, interior angle $A_1$ (i.e., an angle less than 90 degrees). The second central, longitudinal axis B-B and the third central, longitudinal axis C-C intersect to form an obtuse, interior angle $A_2$ (i.e., greater than 90 degrees). In other examples, the neck 202 and the arm 204 may have other shapes, orientations, and/or configurations (e.g., the interior angle $A_1$ may be obtuse, the interior angle $A_2$ may be acute, etc.). The head 200 includes a longitudinal axis D-D intersecting the first central, longitudinal axis A-A of the neck 202 to form an acute, interior angle $A_3$. In the illustrated example, the longitudinal axis D-D intersects the second portion 212 of the arm 204. In other examples, the head 200 has other shapes, orientations, and/or configurations.

Figure 6:
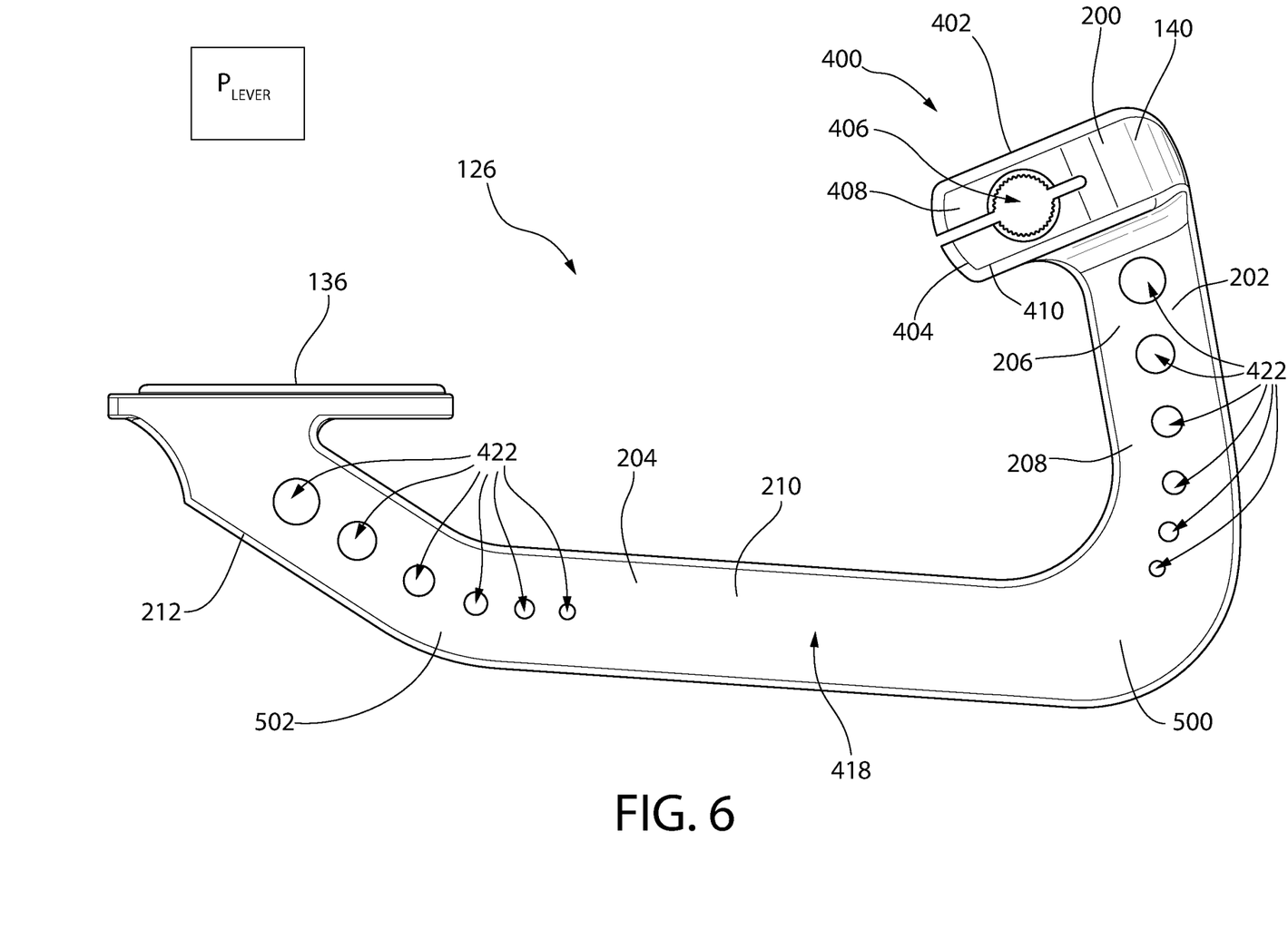
FIG. 6 is a second side view of the heel-shift lever of FIGS. 4-5.

FIG. 6 is a second side view of the example heel-shift lever 126 of FIGS. 1-5. In the illustrated example, the second side 418 of the example neck 202 and the example arm 204 of is substantially planar. Thus, the second side 418 of the neck 202 and the arm 204 does not include a groove or channel. In other examples, the second side 418 of the neck 202 and/or the arm 204 have different configurations, features, and/or components. For example, the second side 418 may include a channel substantially similar or identical to the channel 420.

Figure 7:
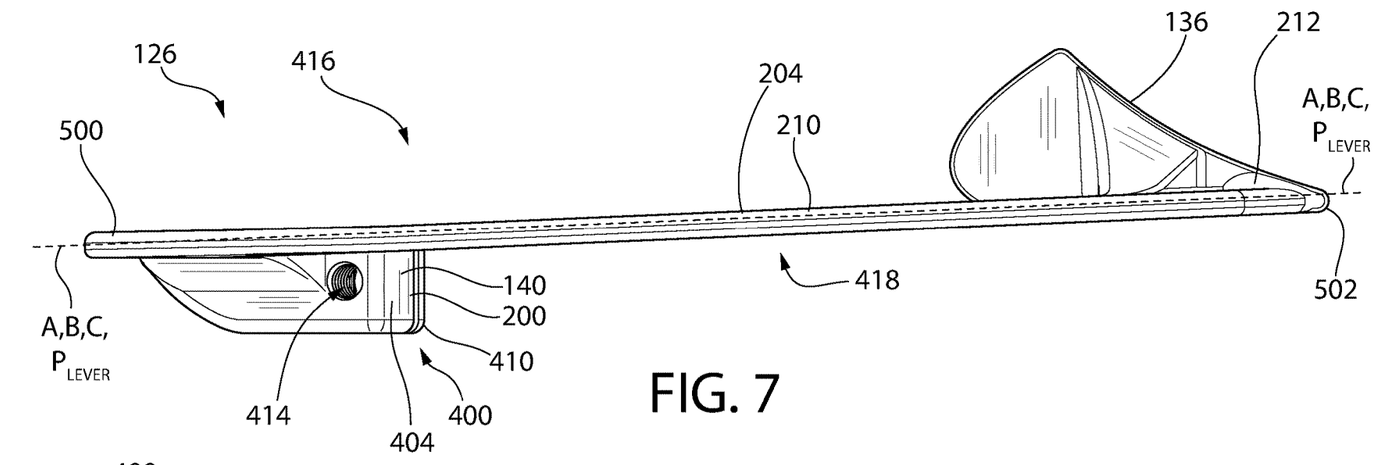
FIG. 7 is a bottom view of the heel-shift lever of FIGS. 4-6.

FIG. 7 is a bottom view of the example heel-shift lever 126 of FIGS. 1-6. In the illustrated example, the head 200 is offset from the platform 136 relative to the neck 202 and the arm 204. For example, the head 200 of FIG. 7 is cantilevered from the neck 202 and overhangs the second side 418, and the platform 136 is cantilevered from the second portion 212 of the arm 204 and overhangs the first side 416. In the illustrated example, the head 200 does not overhang the first side 416 of the neck 202 and the arm 204, and the platform 136 does not overhang the second side 418 of the neck 202 and the arm 204. In some examples, the head 200 is offset from the platform 136 relative to the neck 202 and the arm 204 such that a majority of the head 200 overhangs the second side 418 of the neck 202 and the arm 204 and a minority of the head 20 overhangs the first side 416. In some examples, a majority or more of the platform 136 overhangs the first side 416 of the neck 202 and the arm 204 and a minority of the platform 136 overhangs the second side 418. In other examples, the head 200 and/or the platform 136 are configured in other ways. For example, the head 200 may not be offset from the platform 136 relative to the neck 202 and the arm 204.

Figure 8:
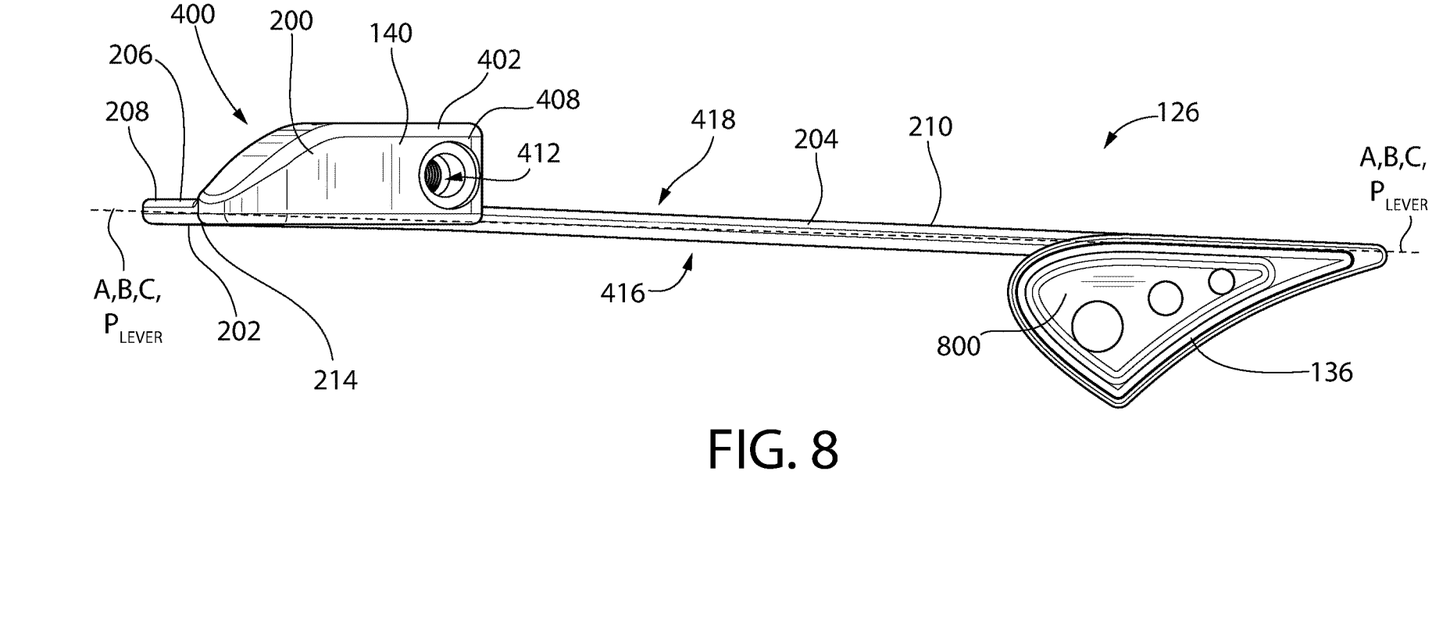
FIG. 8 is a top view of the heel-shift lever of FIGS. 4-7.

FIG. 8 is a top view of the example heel-shift lever 126 of FIGS. 1-7. In the illustrated example, the platform 136 includes a floor or surface 800 to receive a foot of a rider of the motor vehicle 100. In the illustrated example, the surface 800 is fin-shaped. In other examples, the surface 800 of the platform 136 is another shape and/or configuration. For example, the platform 136 may be circular, elliptical, oblong, triangular, flat, diamond-shaped, rounded, curved, symmetrical, asymmetrical, smooth, textured, and/or any other shape and/or configuration. In some examples, the platform 136 is a peg such as, for example, a peg substantially similar or identical to the peg 130 of FIG. 1. In the illustrated example, the platform 136 is integral with the second portion 212 of the arm 204. However, as described in greater detail below in conjunction with FIG. 9, the platform 136 may be coupled to the second portion 210 of the arm 204.

Figure 9:
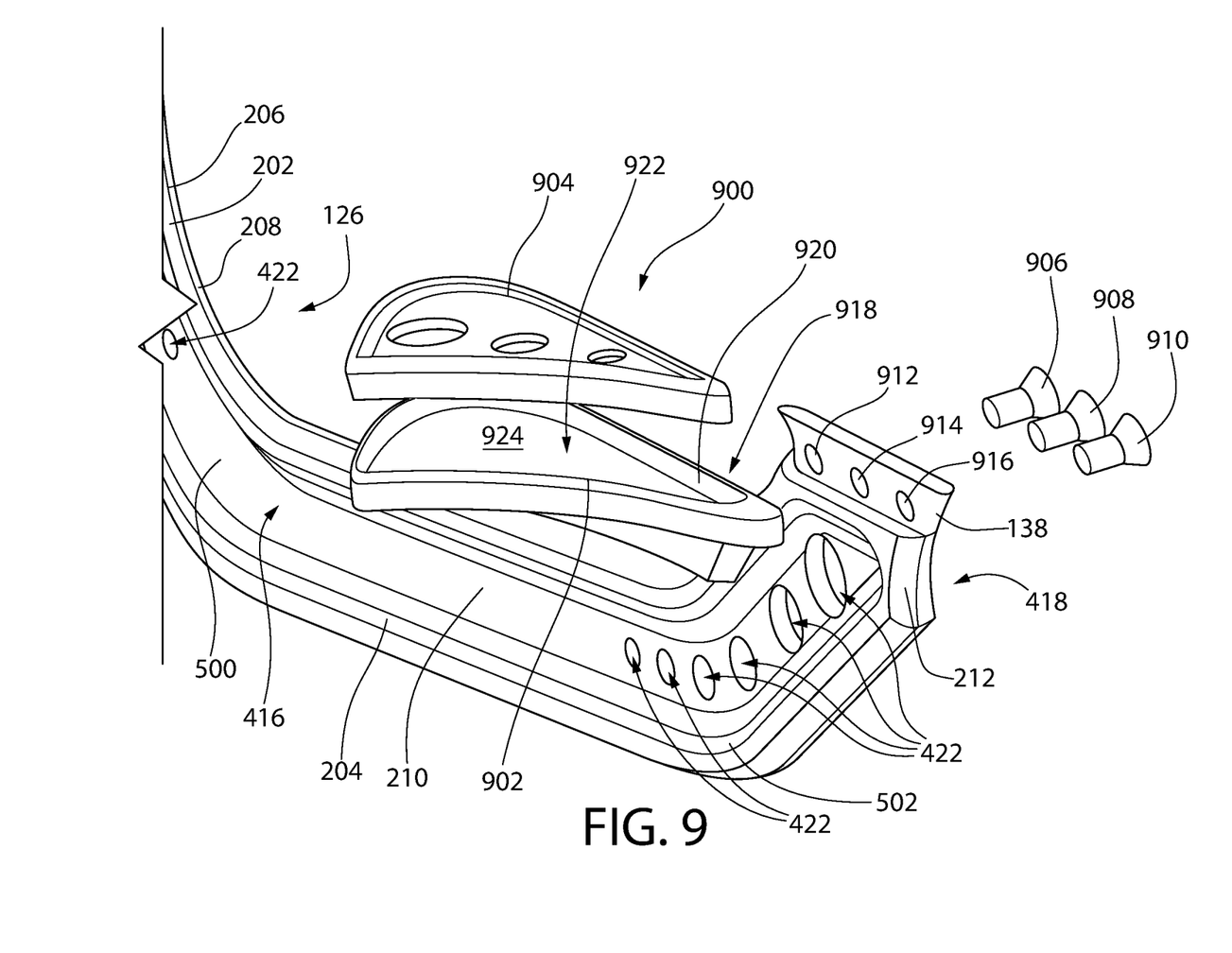
FIG. 9 is an exploded view of the heel-shift lever of FIGS. 4-8 employing an alternative platform disclosed herein.

FIG. 9 is an exploded view of the heel-shift lever 126 of FIGS. 1-8 employing an alternative platform 900 disclosed herein. In the illustrated example, the platform 900 includes a seat 902 and a pad 904. The seat 902 is coupled to the second portion 212 of the arm 204 via a first fastener 906, a second fastener 908, and a third fastener 910. The first fastener 906, the second fastener 908, and the third fastener 910 extend through a first aperture 912, a second aperture 914, and a third aperture 916, respectively, of the second portion 212 of the arm 204 and are received in a side 918 and/or rim 920 of the seat 902 to couple the seat 902 to the second portion 212 of the arm 204. In the illustrated example, the first aperture 906, the second aperture 908, and the third aperture 910 extend from the first side 416 to the second side 418 of the arm 204. The first fastener 906, the second fastener 908, and the third fastener 910 of FIG. 9 are oriented substantially perpendicular to the plane $P_{LEVER}$ (FIGS. 5, 7, 8). In other examples, the seat 902 is coupled to the arm 204 via one or more additional and/or alternative ways.

The rim 920 runs along a perimeter of the seat 902 and defines a boundary of a cavity or receptacle 922 of the seat 902. The pad 904 is received in the receptacle 922. In some examples, the seat 902 sits on a surface 924 of the seat 902. In the illustrated example, the surface 924 is substantially perpendicular to the plane $P_{LEVER}$ (FIGS. 5, 7, and 8). In some examples, the pad 904 is coupled to the seat 902 via one or more fasteners (e.g., an adhesive, screws, bolts, rivets, and/or one or more additional and/or alternative fastener(s)) and/or press or friction fit to the seat 902 via the rim 920. In some examples, the pad 904 is a different material than the seat 902. For example, the pad 904 may be rubber and the seat 902 may be steel. In other examples, the pad 904 is the same material as the seat 902.

In the illustrated example, the seat 902 and the pad 904 are fin-shaped. In other examples, the seat 902 and/or the pad 904 are other shapes and/or configurations. For example, the seat 902 and/or the pad 904 may be circular, elliptical, oblong, triangular, flat, diamond-shaped, rounded, curved, symmetrical, asymmetrical, smooth, textured, and/or any other shapes and/or configurations.

Figure 10:
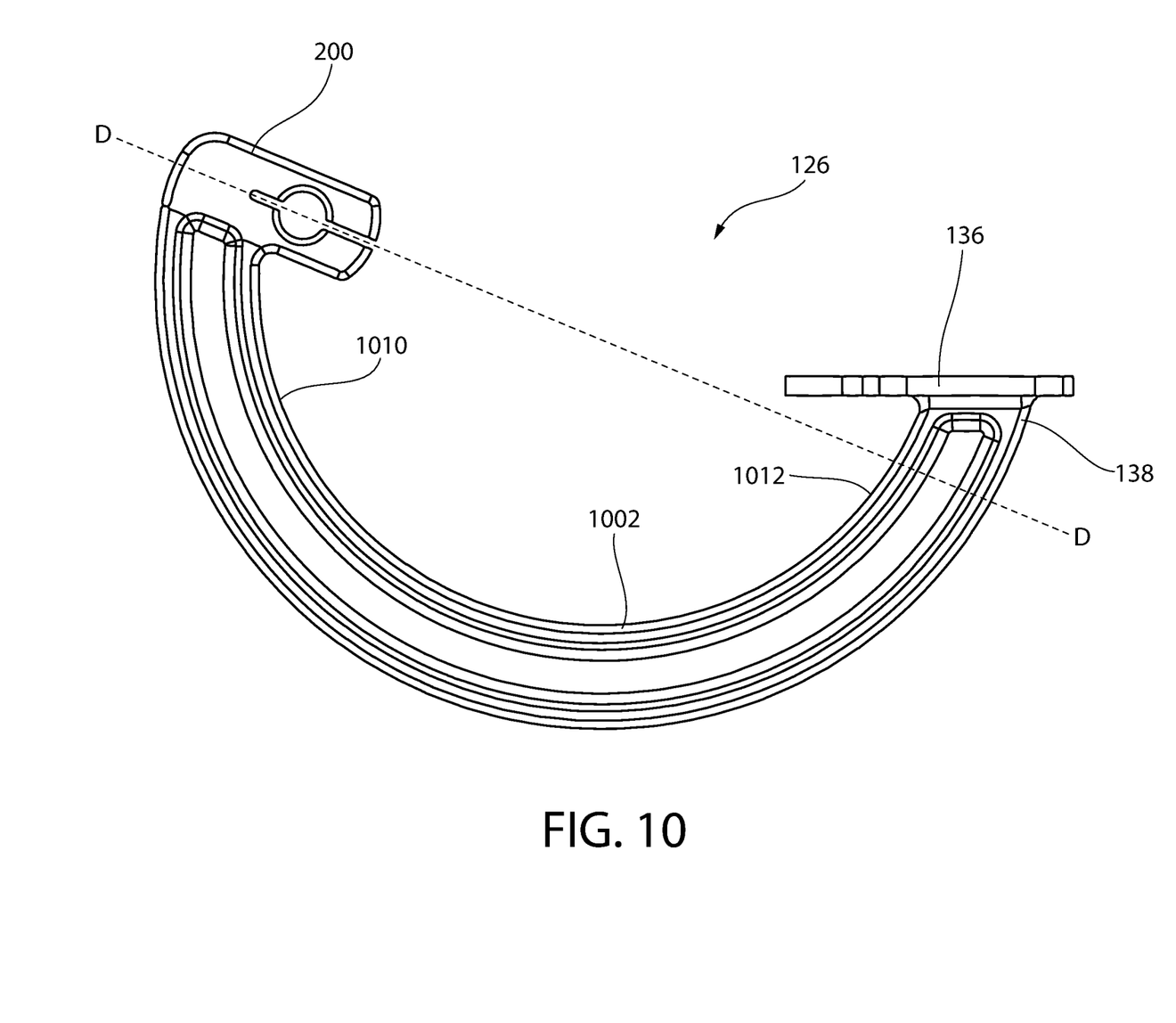
FIG. 10 is a side view of an alternative embodiment of the heel-shifter lever of FIGS. 1-9.

FIG. 10 illustrates the heel-shift lever 126 of FIGS. 1-9 including an alternative shape disclosed herein. In the illustrated example, the heel-shift lever 126 includes the head 200, an arm 1002 extending from the head 200 in the shape of an arc, and the platform 136 disposed on the arm 1002 at the distal end portion 138 of the heel-shift lever 126. In some examples, the head 200 and the arm 1002 may be manufactured from a single piece of metal (e.g., a steel plate) and/or other materials. In other examples, the head 200 and/or arm 1002 may be separate components. In the illustrated example, the arc shape of the arm 1002 has a continuous radius of curvature. In other examples, the arc shape of the arm 1002 does not have a continuous radius of curvature. The arm 1002 includes a first portion 1010 and a second portion 1012. The first portion 1010 extends from the head 200, the second portion 1012 extends from the first portion 1010 (such that the first portion 1010 and second portion 1012 meet at a junction along the arm 1002 equidistant from the head 200 and platform 136), and the platform 136 is disposed on the second portion 1010. The head includes the longitudinal axis D-D intersecting the second portion 1012 of the arm 1002.

Figure 11:
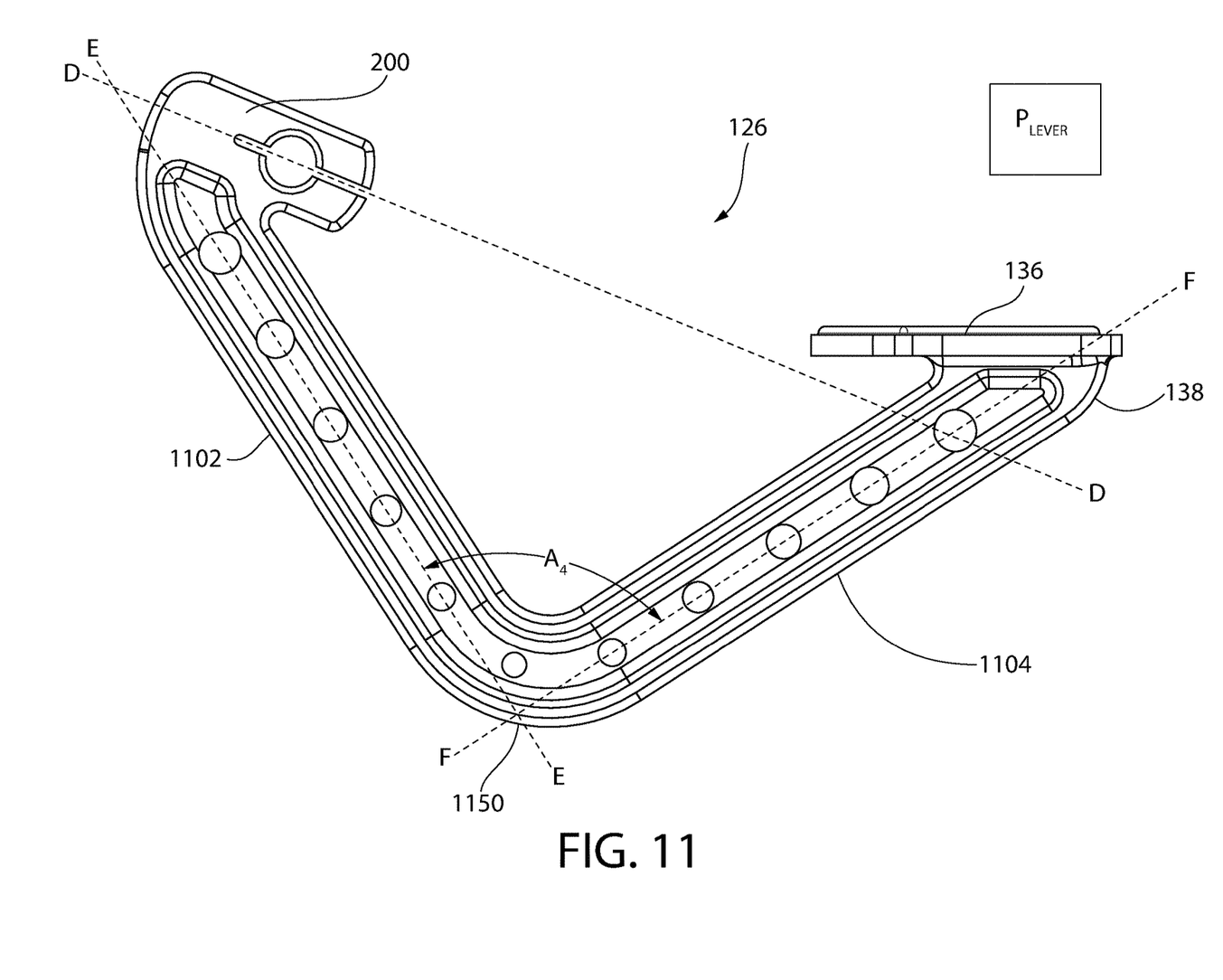
FIG. 11 is a side view of an alternative embodiment of the heel-shifter lever of FIGS. 1-9.

FIG. 11 illustrates the heel-shift lever 126 of FIGS. 1-9 with an alternative neck 1102 and arm 1104 disclosed herein. In the illustrated example, the heel-shift lever 126 includes the head 220, a neck 1102 extending from the head, an arm 1104 extending from the neck 1102, and the platform 136 disposed on the arm 1104 at the distal end portion 138 of the heel-shift lever 126. In some examples, the head 200, the neck 1102, and the arm 1104 may be manufactured from a single piece of metal (e.g., a steel plate) and/or other material. In other examples, the head 200, neck 1102, and/or arm 1104 may be separate pieces. The arm 1104 includes an elbow 1150 disposed between the neck 1102 and the arm 1104. The example elbow 1150 is a curved portion of the arm 1104. In other examples, the elbow 1150 may be a sharp and/or abrupt angle. The neck 1102 includes a first central, longitudinal axis E-E. The arm 1104 includes a second central, longitudinal axis F-F. In the illustrated example, the first central, longitudinal axis E-E and the second, central longitudinal axis F-F are substantially coplanar with the plane $P_{LEVER}$. In other examples, the first central, longitudinal axis E-E and/or the second central, longitudinal axis F-F are not coplanar (e.g., offset and substantially parallel, offset and not substantially parallel, and/or orientated and/or configured in other ways). In the illustrated example, the first central, longitudinal axis E-E and the second central, longitudinal axis F-F intersect to form an acute, interior angle $A_4$ such that the heel-shift lever 126 is substantially V-shaped. The head 200 includes a longitudinal axis D-D that intersects the arm 1104.

Figure 12:
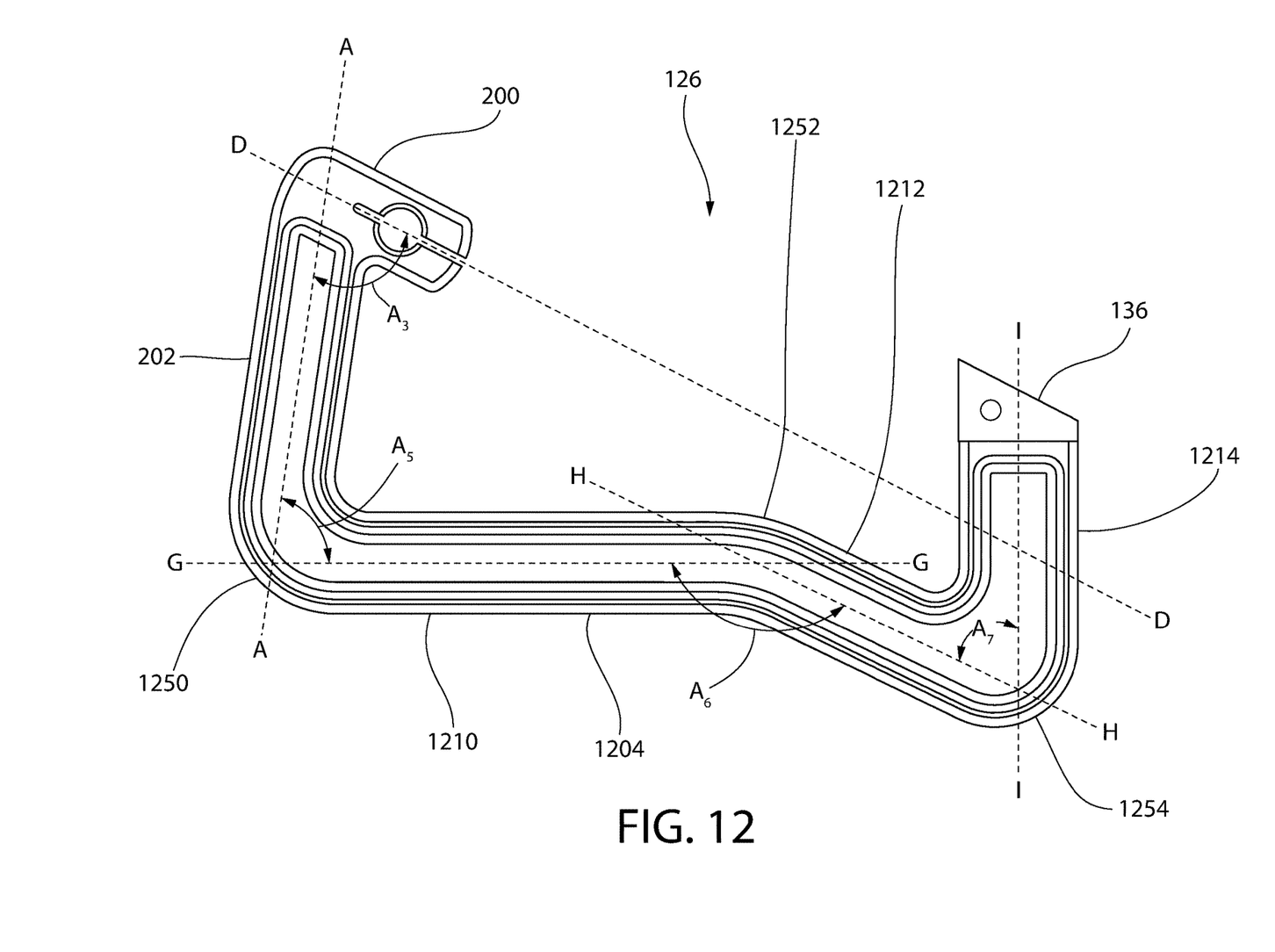
FIG. 12 is a side view of an alternative embodiment of the heel-shifter lever of FIGS. 1-9.

FIG. 12 illustrates the heel-shift lever 126 of FIGS. 1-9 with an alternative arm disclosed herein. In the illustrated example, the heel-shift lever 126 includes the head 200, a neck 202 extending from the head 200, an arm 1204 extending from the neck 202, and the platform 136 disposed on the arm 1204 at the distal end portion 138 of the heel-shift lever 126. In some examples, the head 200, the neck 202, and the arm 1204 may be manufactured from a single piece of metal (e.g., a steel plate) and/or other material. In other examples, the head 200, neck 202, and/or arm 1204 may be separate pieces. The arm 1204 includes a first portion 1210, a second portion 1212, and a third portion 1214. The arm 1204 includes a first elbow 1250 disposed between the neck 202 and the first portion 1210 of the arm 1204, a second elbow 1252 disposed between the first portion 1210 of the arm 1204 and the second portion 1212 of the arm 1204, and a third elbow 1254 disposed between the second portion 1212 of the arm 1204 and the third portion 1214 of the arm 1204. In the illustrated example, the first, second, and third embows 1250, 1252, 1254 are curved portions of the arm 1204. In other examples, the first, second, and third elbows 1250, 1252, 1254 are other shapes or configurations, such as sharp and/or abrupt angles.

The neck 202 includes the first central, longitudinal axis A-A. The first portion 1210 of the arm 1204 includes a second central, longitudinal axis G-G. The second portion 1212 of the arm 1204 includes a third central, longitudinal axis H-H. The third portion 1214 of the arm 1204 includes a fourth central, longitudinal axis I-I. In the illustrated embodiment, the first, central longitudinal axis A-A and the second central, longitudinal axis G-G intersect to form an acute, interior angle $A_5$. The second, central longitudinal axis G-G and the third central, longitudinal axis H-H intersect to form an obtuse, interior angle $A_6$. The third, central longitudinal axis H-H and the fourth central, longitudinal axis I-I intersect to form an acute, interior angle $A_7$. In other examples, the interior angles $A_5$, $A_6$, and/or $A_7$ may be any combination of acute and/or obtuse angles. In the illustrated embodiment, the head 200 includes a longitudinal axis D-D intersecting the third portion 1214 of the arm 1204. In the illustrated example, the first portion 1210 and second portion 1212 of the arm 1204 are below the level of the upper surface 112 of the floorboard 110 when installed on a vehicle and viewed from the side (as in FIG. 2). In some embodiments the first portion 1210 and second portion 1212 of the arm 1204 are not entirely covered by the floorboard 110 when viewed from above (as in FIG. 3).

Figure 13:
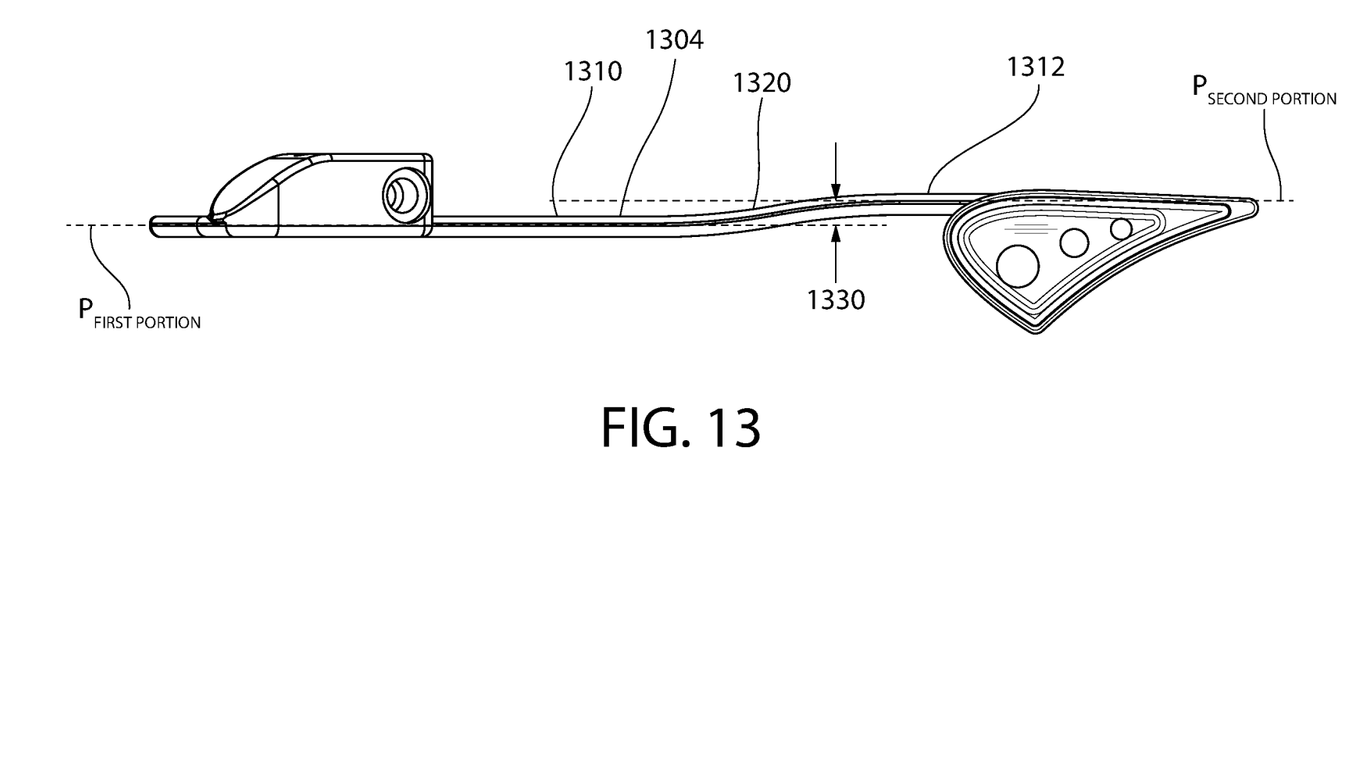
FIG. 13 is a top view of the heel-shift lever of any of FIGS. 1-12.

FIG. 13 is a top view of the example heel-shift lever 126 of any of the preceding Figures. In the illustrated example, the heel-shift lever 126 includes an arm 1304 with a first portion 1310 and a second portion 1312. A plane $P_{FIRST\ PORTION}$ longitudinally bisects the first portion 1310 of the arm 1304. A plane $P_{SECOND\ PORTION}$ longitudinally bisects the second portion 1312 of the arm 1304. The arm 1304 further includes a first bend 1320 disposed between the first portion 1310 and the second portion 1312. In the illustrated example, the first portion 1310 and the second portion 1312 are offset by the bend 1320 such that the plane $P_{FIRST\ PORTION}$ and the plane $P_{SECOND\ PORTION}$ are not coplanar. The plane $P_{FIRST\ PORTION}$ and the plane $P_{SECOND\ PORTION}$ are offset by an offset distance 1330. The offset distance 1330 may be about 0.1 to about 1.0 inches, less than about 0.5 inches, or about 0.2 inches to about 0.3 inches. In the illustrated example, the plane $P_{FIRST\ PORTION}$ and the plane $P_{SECOND\ PORTION}$ are substantially parallel. In other examples, the plane $P_{FIRST\ PORTION}$ and the plane $P_{SECOND\ PORTION}$ are not substantially parallel. In other examples (not illustrated), the arm 1304 may have more than two portions and additional bends between each additional portion (e.g., a second bend disposed between a third portion and a second portion). In these other examples, each bend may offset the adjacent arm 1304 portions in any direction.

Although certain examples have been described in this disclosure, the scope of coverage of this patent is not limited to the examples described herein. This patent covers all methods, apparatus, and articles of manufacture falling within the scope of the claims literally or under the doctrine of equivalents.

What is claimed is:

1. An apparatus, comprising:
a heel-shift lever to be coupled to a motor vehicle, the heel-shift lever including:
a neck including a first portion and a second portion;
a head extending from the first portion of the neck, the head to be disposed higher than a first area of a floor of a floorboard of the motor vehicle and to extend aft from the first portion of the neck when the heel-shift lever is coupled to the motor vehicle; and
an arm extending from the second portion of the neck, said arm having a first portion disposed lower than the first area of the floor of the floorboard and a second portion disposed higher than a second area of the floor of the floorboard when the heel-shift lever is coupled to the motor vehicle; and
a platform disposed on the second portion of the arm, the platform to be aft of the head when the heel-shift lever is coupled to the motor vehicle,
wherein the platform includes a seat and a pad, the pad coupled to the seat.

2. The apparatus of claim 1, wherein the seat is a first material, and the pad is a second material different than the first material.

3. The apparatus of claim 1, wherein the arm includes a first elbow disposed between the neck and the first portion of the arm.

4. The apparatus of claim 3, wherein the arm includes a second elbow disposed between the first portion of the arm and the second portion of the arm.

5. The apparatus of claim 4, wherein a first longitudinal axis of the first portion of the arm intersects a second longitudinal axis of the second portion of the arm to form an obtuse interior angle.

6. The apparatus of claim 5, wherein a third longitudinal axis of the neck intersects the first longitudinal axis to form an acute interior angle.

7. An apparatus, comprising:
a heel-shift lever, wherein when the heel-shift lever is coupled to a motor vehicle, a first portion of the heel-shift lever is disposed higher than a first area of a floor of a floorboard of the motor vehicle, a second portion of the heel-shift lever is disposed lower than the first area of the floor of the floorboard, a third portion of the heel-shift lever is disposed higher than a second area of the floor of the floorboard, the second portion disposed between the first portion and the third portion, and a fourth portion of the heel-shift lever is to interpose a side of the floorboard and at least one of an engine, a transmission, a primary drive, or a cover of the motor vehicle when the heel-shift lever is coupled to the motor vehicle, the side of the floorboard facing at least one of the engine, the transmission, the primary drive, or the cover; and
a platform disposed on the third portion of the heel-shift lever, a portion of the platform to be fore of a rear side of the floorboard when the heel-shift lever is coupled to the motor vehicle.

8. The apparatus of claim 7, wherein the second portion of the heel-shift lever is to be fore of a fulcrum of the heel-shift lever when the heel-shift lever is coupled to the motor vehicle.

* * * * *